(12) United States Patent
Robinson et al.

(10) Patent No.: US 8,950,562 B2
(45) Date of Patent: Feb. 10, 2015

(54) CONTINUOUSLY VARIABLE TRANSMISSION WITH BRAKE

(75) Inventors: Leslie Kendrick Robinson, Leyland (GB); David Ian Cox, Wigan (GB)

(73) Assignee: Torotrak (Development) Limited, Lancashire (GB)

(*) Notice: Subject to any disclaimer, the term of this patent is extended or adjusted under 35 U.S.C. 154(b) by 1053 days.

(21) Appl. No.: 12/863,427

(22) PCT Filed: Jan. 16, 2009

(86) PCT No.: PCT/US2009/031275
§ 371 (c)(1),
(2), (4) Date: Mar. 23, 2011

(87) PCT Pub. No.: WO2009/091993
PCT Pub. Date: Jul. 23, 2009

(65) Prior Publication Data
US 2011/0167942 A1    Jul. 14, 2011

(30) Foreign Application Priority Data

Jan. 17, 2008 (GB) .................................. 0800826.0

(51) Int. Cl.
*B60W 10/101* (2012.01)
*B60W 10/184* (2012.01)
(Continued)

(52) U.S. Cl.
CPC ............ *F16H 37/084* (2013.01); *B60K 17/046* (2013.01); *B60T 7/122* (2013.01);
(Continued)

(58) Field of Classification Search
USPC ...................................... 192/219, 220, 220.1
See application file for complete search history.

(56) References Cited

U.S. PATENT DOCUMENTS

| 4,600,075 A | 7/1986 | Heidner et al. ................ 180/336 |
| 5,617,936 A | 4/1997 | Nemoto ......................... 192/219 |

(Continued)

FOREIGN PATENT DOCUMENTS

| EP | 1 378 686 | 1/2004 |
| GB | 901 967 | 7/1962 |
| GB | 1 238 121 | 7/1971 |

OTHER PUBLICATIONS

International Preliminary Report on Patentability issued in WO 2009/091993, dated Jul. 20, 2010.
(Continued)

*Primary Examiner* — Troy Chambers
*Assistant Examiner* — Ryan Dodd
(74) *Attorney, Agent, or Firm* — Fulbright & Jaworski LLP

(57) ABSTRACT

A transmission is disclosed for a wheeled vehicle. The transmission has a rotary input (14) to be driven by a rotary power source, e.g. an internal combustion engine. It has a rotary output (16) for driving a vehicle wheel. A transmission unit is coupled between the rotary input and the rotary output to transfer drive between them at a speed ratio which is continuously variable through a range which includes both negative ratios (providing a reversal of rotational direction between the rotary input and the rotary output), positive ratios (in which the rotary input and the rotary output rotate in the same direction), and a geared neutral ratio, in which the rotary output is stationary. In accordance with the invention, the transmission further comprises a brake (20) for braking the rotary output. The brake is provided with a control arrangement adapted to apply it when the speed ratio is set to the geared neutral ratio and to release the brake as the speed ratio is adjusted away from the geared neutral ratio.

16 Claims, 8 Drawing Sheets

(51) Int. Cl.
  *F16H 37/08* (2006.01)
  *B60K 17/04* (2006.01)
  *B60T 7/12* (2006.01)
  *B60W 10/18* (2012.01)
  *B60W 30/18* (2012.01)
  *F16D 55/224* (2006.01)
  *F16D 121/16* (2012.01)
  *F16D 125/28* (2012.01)
  *F16H 63/30* (2006.01)

(52) U.S. Cl.
  CPC ............ *B60W 10/101* (2013.01); *B60W 10/18* (2013.01); *B60W 30/18181* (2013.01); *F16D 55/224* (2013.01); *B60Y 2200/225* (2013.01); *F16D 2121/16* (2013.01); *F16D 2125/28* (2013.01); *F16H 37/0846* (2013.01); *F16H 37/086* (2013.01); *F16H 2063/3033* (2013.01)
  USPC ....................... 192/219; 74/473.19

(56) References Cited

U.S. PATENT DOCUMENTS

| 5,984,431 | A | 11/1999 | Schmitt | 303/119.1 |
| 6,912,831 | B2 | 7/2005 | Velke et al. | 56/10.9 |
| 2006/0172857 | A1* | 8/2006 | Eavenson et al. | 477/203 |
| 2008/0190084 | A1* | 8/2008 | Piontek | 56/11.3 |
| 2009/0266654 | A1* | 10/2009 | Holland | 188/73.31 |

OTHER PUBLICATIONS

International Search Report issued in WO 2009/091993, dated Aug. 3, 2009.
Extended European Search Report in Application No. 09701499.7 dated Feb. 27, 2012.

* cited by examiner

US 8,950,562 B2

CONTINUOUSLY VARIABLE TRANSMISSION WITH BRAKE

CROSS REFERENCES TO RELATED APPLICATIONS

This application is a national phase application under 35 U.S.C. §371 of International Application No. PCT/US2009/031275 filed Jan. 16, 2009, which claims priority to Great Britain Application No. 0800826.0 filed Jan. 17, 2008, both of which are incorporated by reference without disclaimer.

BACKGROUND

The present invention is concerned with improvements to continuously variable transmissions which are able to provide infinite speed reduction ("geared neutral").

FIG. 1 represents, purely by way of example and in highly schematic form, one such transmission. Box 10 represents a variator—that is, a device having a rotary variator input 6, a rotary variator output 8, and a mechanism for transferring drive between the two at a speed ratio (the "variator ratio") which can be continuously (steplessly) varied over a finite range. Variators of numerous different types are known in the art. The variator may for example be a toroidal race rolling traction device as described in Torotrak (Development) Ltd's published UK application GB2423122 and its PCT counterpart WO2006084905. Box 12 represents an epicyclic (planetary) gear. The general construction of such gearing is well known and will not be described herein beyond noting that it comprises, in conventional manner, a central sun gear engaging with planet gears which are mounted upon a carrier and engage in their turn with an outer annular gear. The carrier is coupled through gearing $R_1$ to a rotary input 14 of the transmission. The sun gear is coupled through the variator 10 and gearing $R_2$ to the same transmission input 14. The annular gear is coupled via gearing $R_3$ to a rotary output 16 of the transmission.

The transmission input 14 would typically be coupled to some source of rotary drive, such as the internal combustion engine of a motor vehicle. The transmission output 16 would be connected to some point of power usage, such as the driven wheels of the vehicle. The transmission serves to transfer drive between the two. The ratio of transmission output speed to transmission input speed is a function of the variator ratio, and is thus continuously variable.

Gearing in such a transmission is typically designed such that there is a certain variator ratio (the "geared neutral variator ratio") at which the speeds of the carrier and sun gears cancel each other out, leaving the annular gear, and the transmission output 16, stationary, despite the fact that they remain mechanically coupled to the rotating transmission input 14. This is the infinite speed reduction referred to above, and transmissions having this facility are sometimes referred to as "infinitely variable transmissions". Variator ratios to one side of the geared neutral variator ratio provide rotation of the transmission output 16 in one direction (e.g. forward drive for a motor vehicle). Variator ratios to the other side of geared neutral provide transmission output rotation in the opposite direction (reverse drive).

If one defines the speed ratio of the transmission to be the rotational speed of its output divided by that of its input, and takes rotation in one direction to be positive and rotation in the other direction to be negative, then speed ratio is positive when the transmission input rotate in the same direction, and negative when they rotate in opposite directions.

Other vehicle transmissions typically require a clutch or other means to mechanically de-couple the engine from the wheels when the vehicle is brought to rest, and to accommodate an initial mismatch of speeds between engine and transmission during vehicle launch. An infinitely variable transmission, however, makes it possible to halt the vehicle, and to move off from rest, without need of any such launch device, merely by appropriate adjustment of variator ratio.

It should be noted that the particular layout represented in FIG. 1 is presented merely in order to illustrate the general principles and is by no means the only arrangement suitable for implementing an infinitely variable transmission.

A problem can arise in relation to changes of engine speed. Suppose that the vehicle is stationary, the transmission is in geared neutral and the engine is idling. The driver then abruptly raises engine speed, in preparation for vehicle launch, but does not yet adjust the variator ratio. Since the ratio remains at its neutral setting, the driver's expectation is that no torque will yet be exerted on the vehicle wheels. However, inertias within the transmission must accelerate along with the engine. These inertias are mechanically coupled to the transmission output 16. The torque required to accelerate the inertias is reacted partly to the transmission output, and consequently a torque is briefly experienced at the vehicle wheels, potentially causing the vehicle to jerk forwards or backwards.

Another problem can arise if the transmission is not set precisely to geared neutral when the driver requires it, in which case unwanted creep of the vehicle may result.

SUMMARY

In accordance with a first aspect of the present invention, there is a transmission for a wheeled vehicle, the transmission having a rotary input to be driven by a rotary power source, a rotary output for driving a vehicle wheel, and a transmission unit coupled between the rotary input and the rotary output to transfer drive between them at a speed ratio which is continuously variable through a range which includes negative ratios, providing a reversal of rotational direction between the rotary input and the rotary output, positive ratios, in which the rotary input and the rotary output rotate in the same direction, and a geared neutral ratio, in which the rotary output is stationary, the transmission being characterised in that it further comprises a brake for braking the rotary output and a control arrangement adapted to apply the brake when the speed ratio is set to the geared neutral ratio and to release the brake as the speed ratio is adjusted away from the geared neutral ratio.

Specific embodiments of the present invention will now be described, by way of example only, with reference to the accompanying drawings, in which:

DETAILED DESCRIPTION

Figure 1:
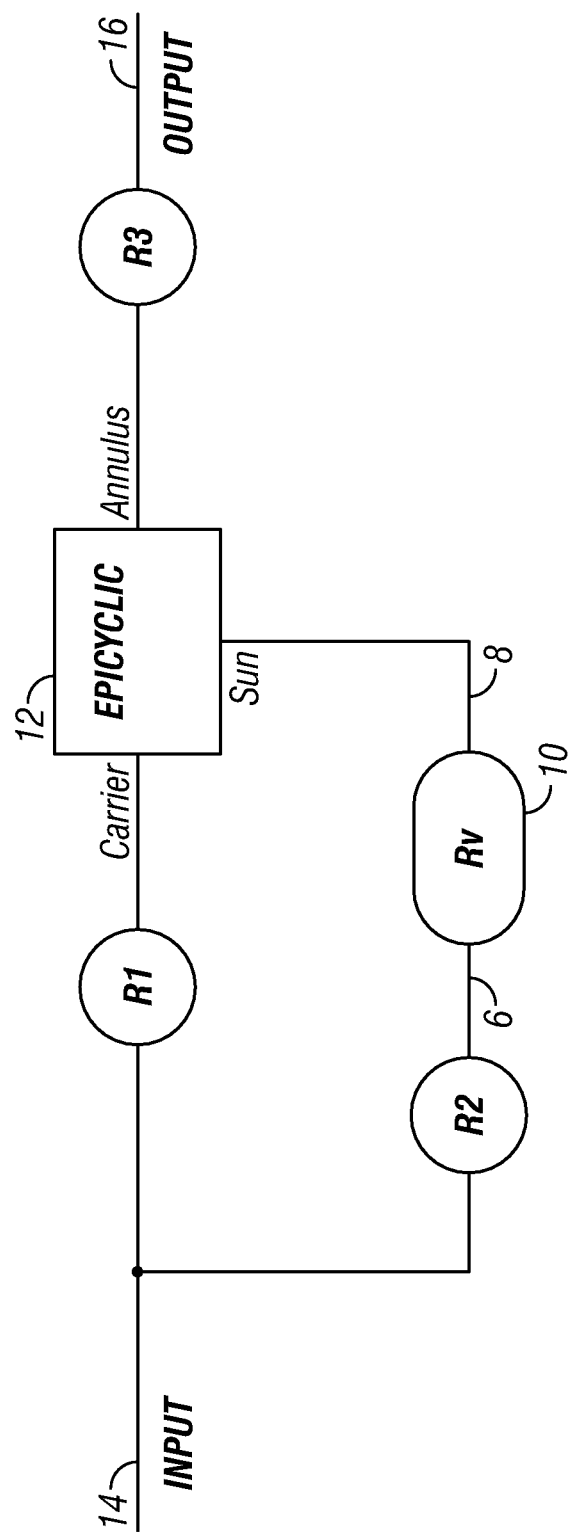
FIG. 1 is a schematic representation of major components of an infinitely variable transmission.
Figure 2:
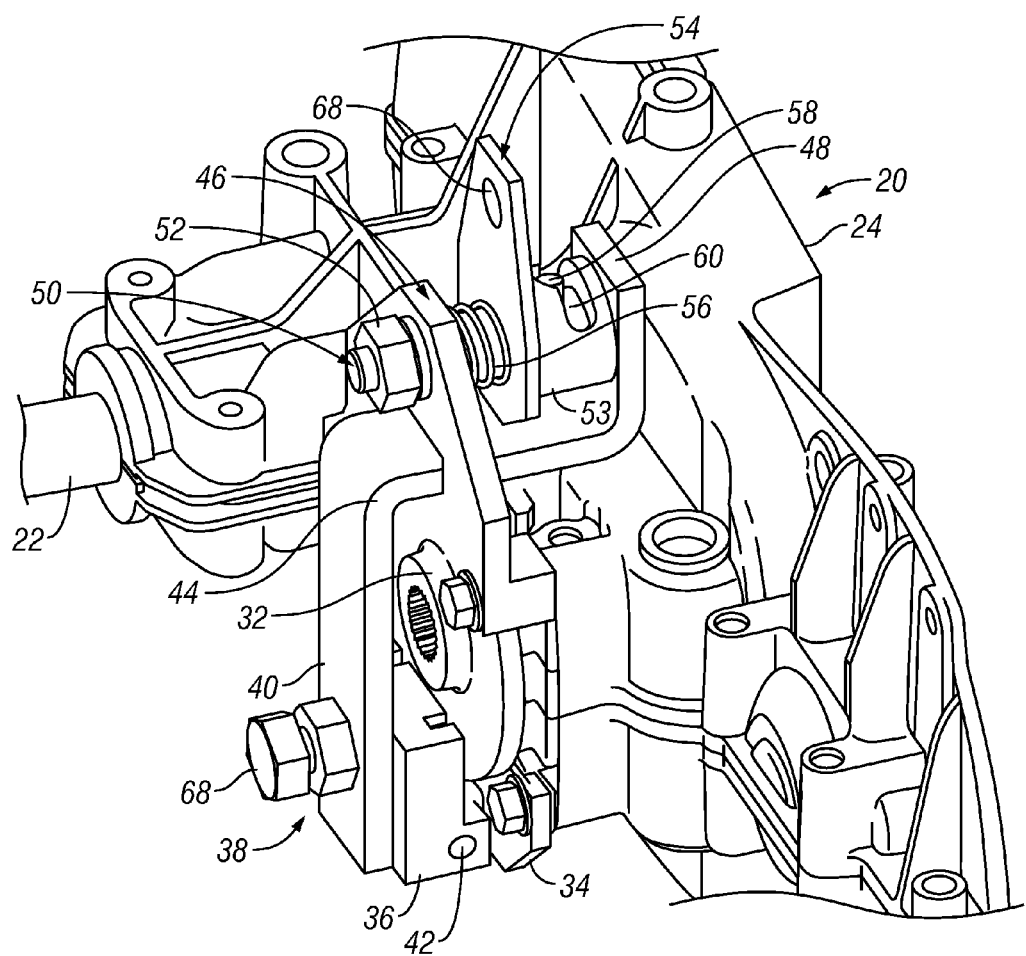
FIG. 2 is a view of a brake mechanism embodying the present invention.
Figure 3:
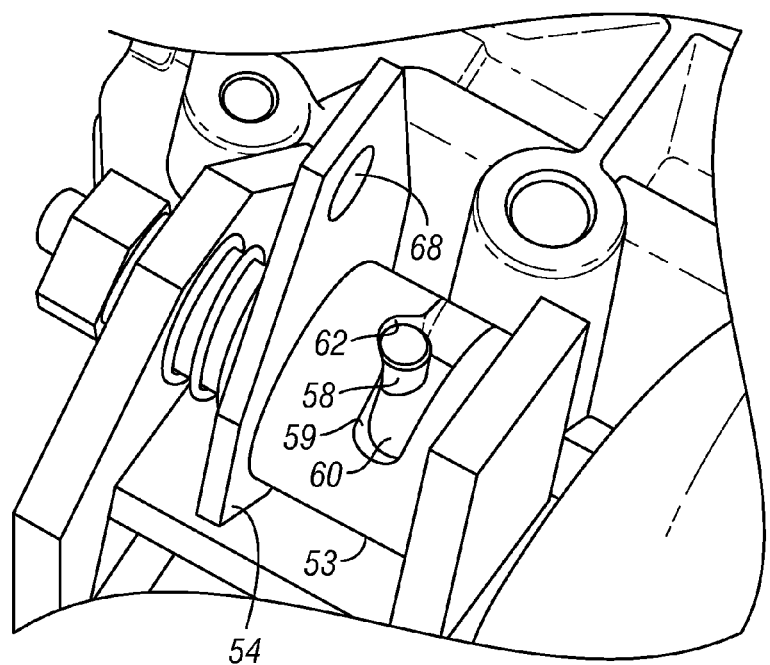
FIGS. 3 and 4 are both views of part of the same brake mechanism, showing alternative profiles of a guide slot.
Figure 4:
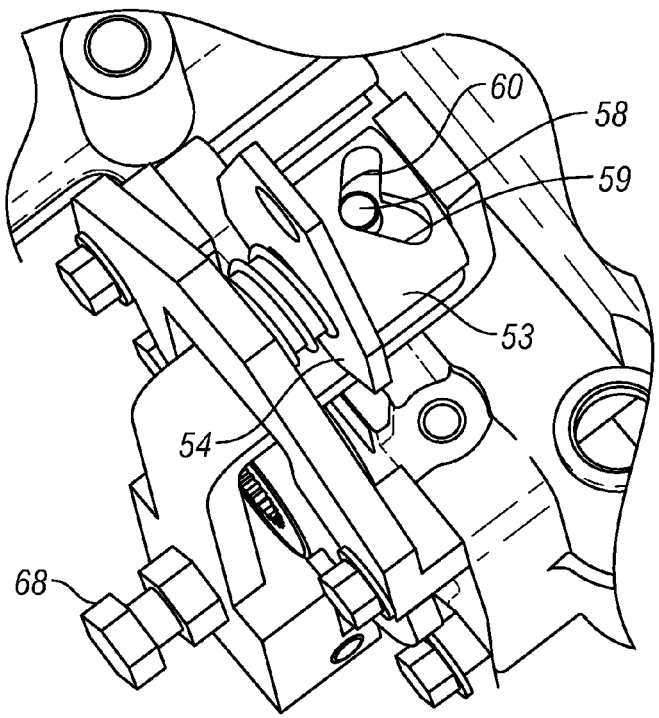

The mechanism 20 illustrated in FIGS. 2-4 forms a disc brake which is automatically applied when the transmission is in geared neutral and released at other times.

The brake mechanism 20 has been developed for use in a constructionally simple agricultural vehicle, specifically a "ride-on" lawnmower. In this vehicle the left and right hand wheels are driven from a common engine through respective transmissions whose speed ratios (i.e. the ratio of engine speed to wheel speed) are independently and continuously variable. Such a vehicle may be steered merely by adjustment of the transmissions' ratios, and may be highly manoeuvrable. For instance by setting the transmissions to cause the vehicle wheels to rotate in opposite directions at equal speeds the vehicle can be caused to spin on the spot, an operation referred to as a "zero turn".

Figure 6:
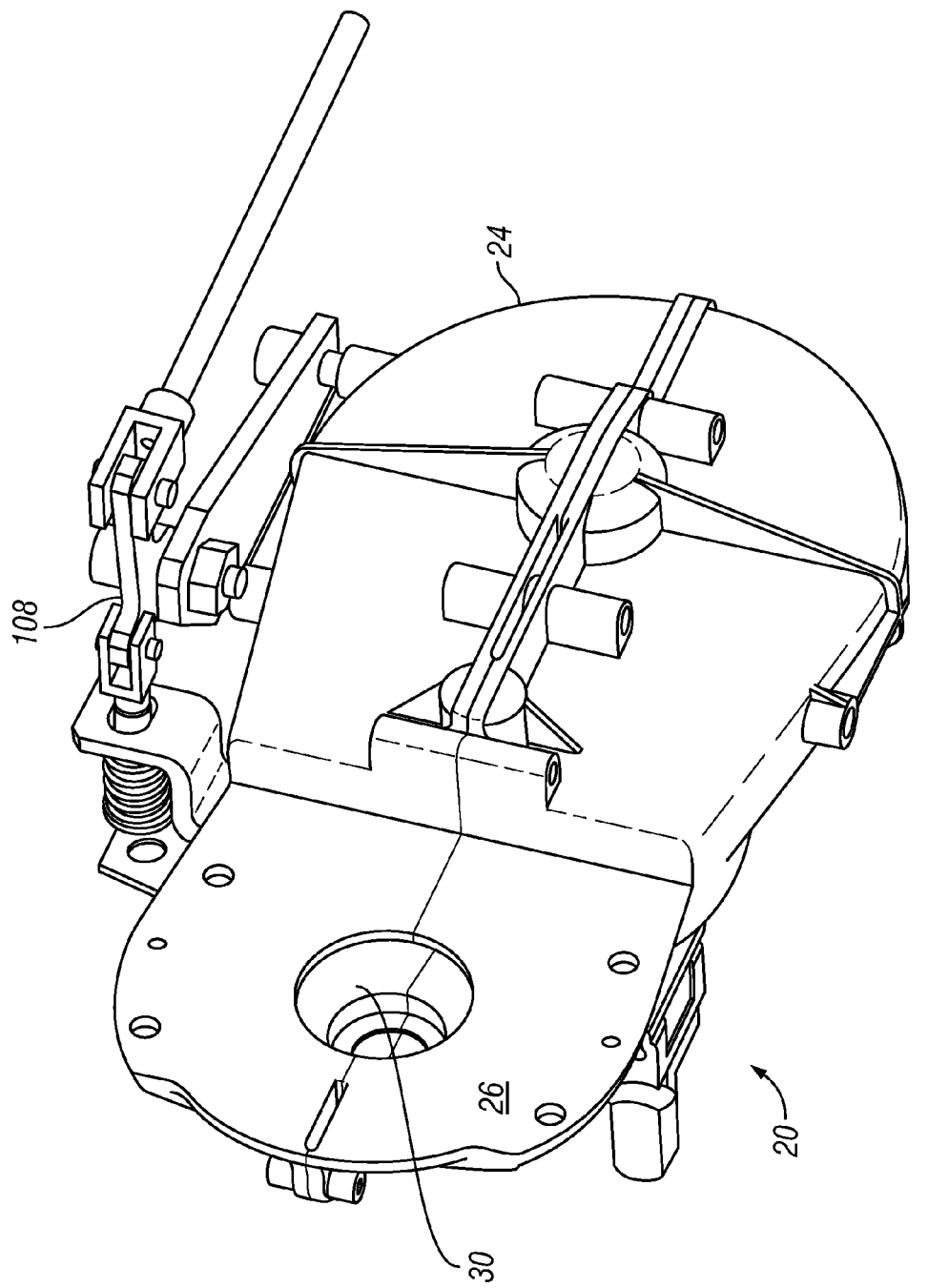
FIG. 6 illustrates the mechanism of FIG. 5, viewed from one side.
Figure 7:
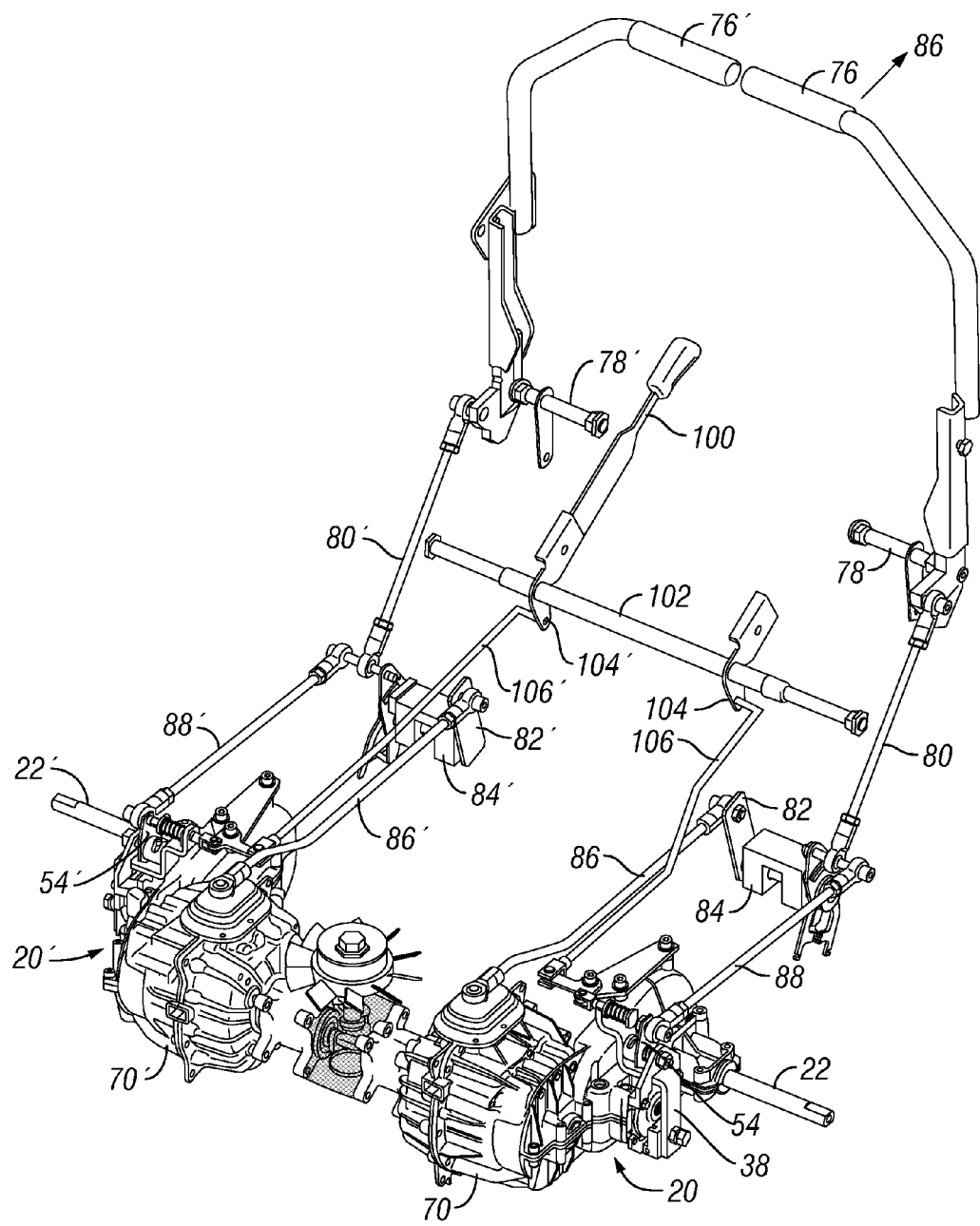
FIG. 7 is a view from above and to one side of a vehicle transmission embodying the present invention and incorporating the brake mechanism of FIG. 2, and additionally includes a mechanical arrangement for controlling both transmission and brake.
Figure 8:
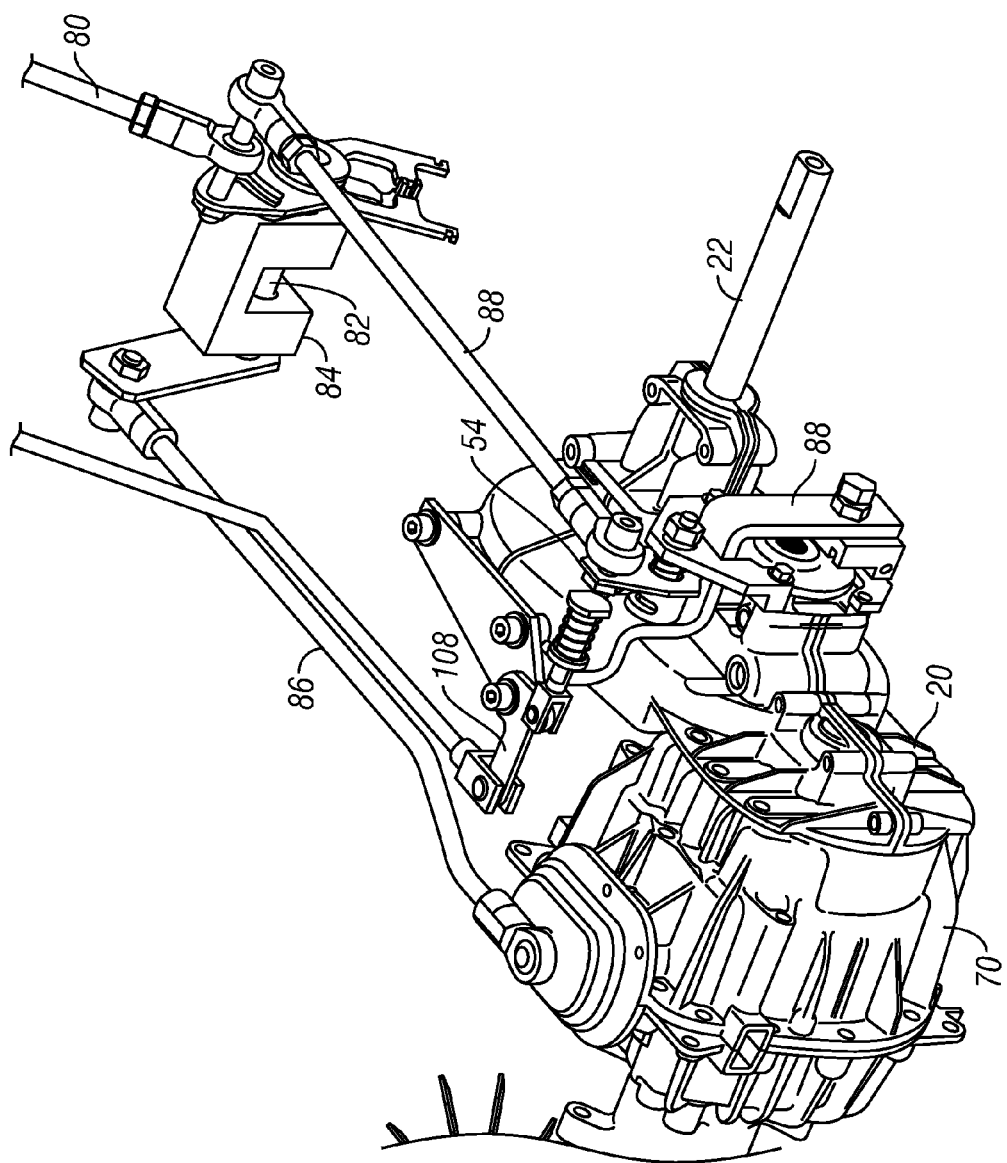
FIG. 8 shows one side only of the FIG. 7 arrangement, to a larger scale.

Both of the vehicle's transmissions incorporate, in accordance with the present invention, a brake mechanism 20, which is to be mounted adjacent to a driven vehicle wheel (not shown) and incorporates a wheel shaft 22 which carries the vehicle wheel and is the final output of the transmission. The brake mechanism is mounted on a main housing 24, seen in FIG. 6 to have at its front a mounting surface 26 to which a continuously variable transmission unit is to be secured with its output shaft protruding through an opening 28 in the housing wall to engage with a first gear 30 rotatably mounted within the main housing 24. The transmission unit is not shown in FIGS. 2 to 6 but FIGS. 7 and 8 show the main housing 24 mounted on the transmission unit 70 in this manner.

Concealed within main housing 24 are a second, idler, gear (not seen) which meshes with the first gear 30, and a third, output, gear (not seen) which meshes with the idler gear and drives the wheel shaft 22. The first to third gears are of ascending sizes and form a gear train which provides a speed reduction at the wheel shaft 22.

A brake disc 32 is seen in FIG. 2 to have a splined central bore through which it is mounted upon a shaft (omitted from the drawing for clarity) which extends into and rotates along with the idler gear. Braking the disc 32 thus brakes the aforementioned gear train, and hence the wheel shaft 22. The brake could in principle act on a different transmission component, but in the particular example illustrated braking the idler gear provides the best compromise, neither rotational speed nor torque being excessive at this point. Brake pads are mounted on both sides of the brake disc 32, although both are hidden in the drawings. One is carried on a plate 34 secured to the main housing 24. The other is carried by an "L" shaped block 36 forming part of a brake lever 38, moving which causes the brake to be applied and released. The brake lever 38 further comprises an arm 40 secured to the block 36 e.g. by welding. It has a fulcrum formed by a pin 42 received by the "L" shaped block 36.

The arm 40 is elbowed at 44 to pass through a clearance opening in a fixed pivot plate 46 secured to the main housing 24, and terminates in an upstanding end plate 48 which mounts a pivot pin 50. The pivot pin 50 extends through a bore in the pivot plate 46 and is rendered captive by a nut 52 on the opposite side of the pivot plate 46 from the end plate 48.

Carried upon the pivot pin 50, between the fixed pivot plate 46 and the end plate 48, are (i) a sleeve part 53 of a control lever 54 and (ii) a helical spring 56. The spring 56 is pre-stressed in compression between the pivot plate 46 and the control lever 54, and its force can be transferred through the control lever to the end plate 48 to apply the brake. However the spring force can be selectively relieved, to release the brake, as will now be explained.

The control lever 54 cooperates with a cam pin 58 mounted in and radially protruding from the pivot pin 50 to form a cam mechanism controlling the brake lever 38. Its sleeve part 53 has a cam surface 59 (see FIGS. 3 and 4 in particular), formed in this embodiment within a slot 60, which runs upon the cam pin 58 and is biased against it by the action of the spring 56. The surface 59 may for example be formed with a détente 62, as in FIG. 3, or with a "V" shape, as in FIG. 4. In either case it will be apparent that turning the control lever 54 causes the control lever 54 to move along the pivot pin 50, releasing the spring biasing from the end plate 48 and permitting the brake lever 38 to turn slightly and so release the brake. The profile of the cam surface 59 is chosen to provide a desired brake characteristic. The profile of FIG. 3, for example, gives a relatively abrupt application of the brake at geared neutral. The "V" profile at FIG. 4 gives more progressive brake application and release.

An adjuster 68 is threadedly received in the L shaped block 36 and acts on its adjacent brake pad, enabling the pad to be advanced e.g. to accommodate wear.

The brake mechanism 20 is controlled by a mechanical arrangement in coordination with the vehicle's transmission. The control arrangement will now be described with reference to FIGS. 7 to 9. This arrangement has been developed for use in the agricultural vehicle mentioned above, although it must be understood that the invention could be applied in any of a wide range of vehicles. This particular vehicle is controlled through right and left driver operable hand levers 76, 76' each rotatable through a limited range about respective pivots 78, 78'. Through the hand levers the driver controls the drive ratio provided by right and left continuously variable transmission units 70, 70'. Movement of either hand lever 76, 76' is transmitted through a respective first push rod 80, 80' to a respective crank 82, 82' rotatably mounted in a respective bearing block 84, 84'. Cranks 82, 82' are each coupled to a respective transmission push rod 86, 86' which in its turn is coupled to the corresponding transmission unit 70, 70' to control its ratio.

Placing either hand lever 76, 76' at the end of its travel in the forward direction (arrow 86 in FIG. 7) provides maximum forward drive ratio and hence maximum forward rotation speed (for a given engine speed) at the corresponding wheel shaft 20, 22'. Moving either hand lever to the end of its travel in the opposite direction causes a progressive and continuous adjustment of the transmission ratio until it achieves maximum reverse rotation speed. In between these extremes is a hand lever position which corresponds to geared neutral—i.e. to zero rotation speed of the wheel shaft 22 or 22'. When the hand lever is placed in this position, the brake 20 is automatically applied.

To this end, each of the aforementioned control levers 54, 54' of the brake mechanisms 20, 20' is coupled to a respective brake push rod 88, 88', and each push rod is coupled to the corresponding crank 82, 82' to be moved as the crank turns. Push rod lengths are chosen such that the brake is applied when the corresponding hand lever 76, 76' is in the geared neutral position.

By automatic application of the brake when the transmission is at geared neutral, the problem explained above of unwanted movement of a hitherto stationary vehicle upon sudden engine acceleration is avoided. Any tendency for the vehicle to suffer "creep"—i.e. slow movement when in geared neutral, due to failure to select the appropriate variator ratio with sufficient precision, can likewise be resisted by the brake.

Note that release of the brake as the transmission is moved away from geared neutral may be gradual, so that the brake would be applied over a limited range of hand lever positions on either side of geared neutral.

Figure 5:
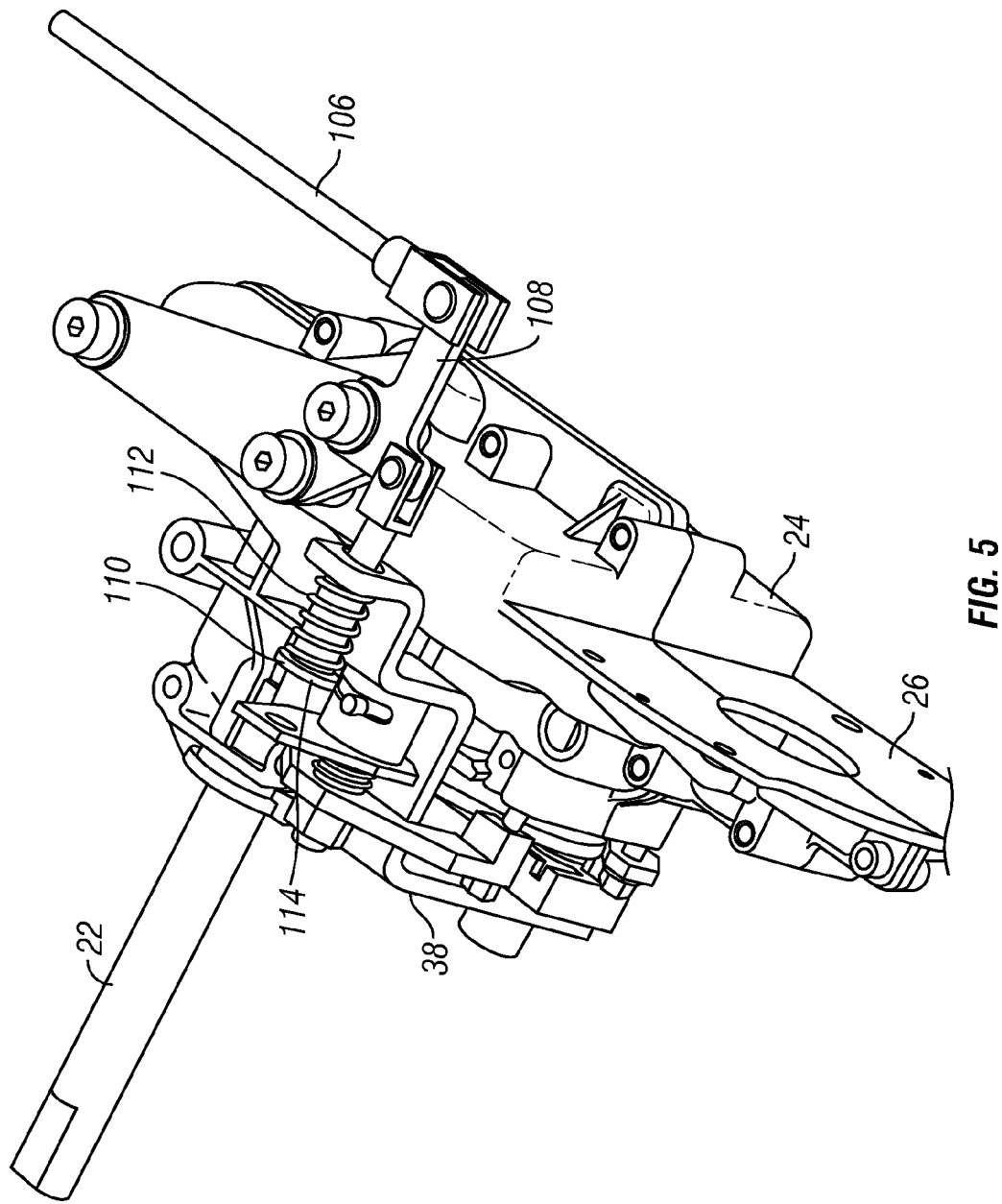
FIG. 5 is a view of a development of the brake mechanism, incorporating a parking brake function, viewed from above.

The brake mechanism can be adapted to additionally provide a user operable "parking brake" function. That is, a separate user operable control can be provided to apply the brake regardless of transmission ratio. In the FIG. 7 embodiment this control is formed as a brake lever 100 carried on a rotatably mounted brake bar 102 which further carries actuating levers 104, 104' coupled to respective park brake push rods 106, 106'. In FIGS. 5 and 6 park brake push rod 106 is seen to be coupled to one limb of an "T" planform lever 108 pivotally mounted on the brake's main housing 24, its other limb being coupled to a pull rod 110 which passes through the brake lever 38 and acts upon it through a helical spring 112 retained on the pull rod by its enlarged head 114. Note that the brake lever 38 differs from the one depicted in FIG. 2 in that it has been extended upwardly to meet the pull rod. To apply the parking brake the driver raises brake lever 100, causing pull rods 110 of both brake mechanisms to move to apply both brakes.

The transmission units 70, 70' may take any of a number of different forms. They may for example be of "expanding pulley" type. However the preferred type of transmission unit uses a variator of toroidal race, rolling traction type, having a movable control member such as a lever whose position determines the variator's ratio. A suitable unit is described in GB 2423122 and in WO 2006084905, and the attention of the reader is directed thereto for information on the construction of such a variator.

The invention is however applicable particularly to transmissions whose variator is of "ratio control" type. That is to say that the ratio adopted by the variator is directly determined by its control system. Certain variators are instead "torque controlled"—they receive an input indicative of the torque to be reacted through the variator casing, and changes in ratio take place automatically as a result of the action of the resultant torque on system inertias.

Figure 9:
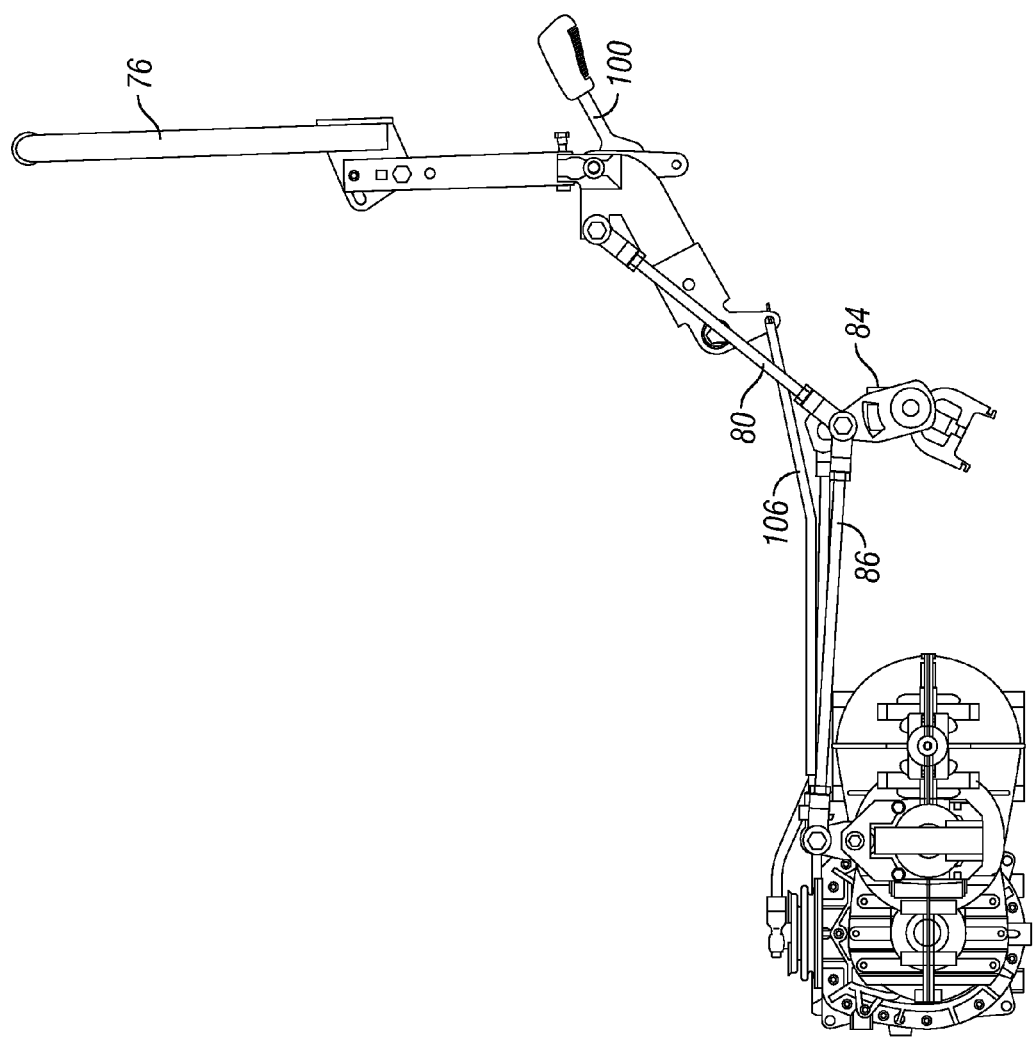
FIG. 9 is a view from one side of the FIG. 7 arrangement.

The aforegoing embodiments are described by way of example only. Numerous other ways of implementing the invention are possible. For example the mechanism of FIGS. 7 to 9 provides the user with hand levers 76, 76' to control the transmissions. Other "zero turn" vehicles use a steering wheel and speed control pedal instead, but may equally well be modified to incorporate the brake of the present invention.

The invention claimed is:

1. A transmission for a wheeled vehicle, the transmission having a rotary input capable of being driven by a rotary power source, a rotary output capable of driving a vehicle wheel, and a transmission unit coupled between the rotary input and the rotary output to transfer drive between them at a speed ratio which is continuously variable through a range which includes: negative ratios, providing a reversal of rotational direction between the rotary input and the rotary output; positive ratios, in which the rotary input and the rotary output rotate in the same direction; and a ratio at which the rotary output is stationary; the transmission further comprising a brake for braking the rotary output and a control arrangement adapted to automatically apply the brake when the speed ratio is set to the ratio at which the rotary output is stationary, and to automatically release the brake as the speed ratio is adjusted away from the ratio at which the rotary output is stationary.

2. A transmission as claimed in claim 1 further comprising a user operable control part which is mechanically coupled to the transmission unit such that the control part's position dictates the speed ratio.

3. A transmission as claimed in claim 2 in which the user operable control part is mechanically coupled to the brake such that when positioned to set the transmission unit to the ratio at which the rotary output is stationary it automatically causes the brake to be applied.

4. A transmission as claimed in claim 2 in which the brake comprises a cam mechanism coupled to the control part to apply and release the brake.

5. A transmission as claimed in claim 4 in which the cam mechanism comprises a cam part which has a cam surface profiled to provide a predetermined variation of brake force with speed ratio.

6. A transmission as claimed in claim 2 comprising a pre-stressed spring arranged to exert a force to apply the brake, and a mechanism coupled to the user operable control to selectively relieve the spring's force to release the brake.

7. A transmission as claimed in claim 6 comprising a brake lever which has a fulcrum and is arranged to act upon a brake pad and to be acted upon by the pre-stressed spring, the brake pad being closer to the fulcrum than the spring.

8. A transmission as claimed in claim 7 in which the brake is a disc brake.

9. A transmission as claimed in claim 2 in which the user operable control is a lever coupled to the transmission unit through at least one push rod.

10. A transmission as claimed in claim 9 in which the user operable control part is coupled to the brake through at least one push rod.

11. A transmission as claimed in claim 9 in which the user operable control part is coupled to a first push rod which is coupled in turn to a crank, the crank being coupled to the transmission unit through a transmission push rod.

12. A transmission as claimed in claim 11 in which the brake is coupled to the crank through a crank push rod.

13. A transmission as claimed in claim 1 further comprising a user operable parking brake control part movable between a parking brake release position, in which it does not affect the brake's operation, and a parking brake apply position, in which it causes the brake to be applied whether or not the speed ratio is at the ratio at which the rotary output is stationary.

14. A transmission arrangement comprising two transmission arrangements as claimed in claim 13 whose speed ratios and brakes are independently controllable and whose rotary outputs are for coupling to wheels on opposite sides of a vehicle.

15. A transmission arrangement as claimed in claim 14 in which the user operable parking brake control part is coupled to both brakes and causes both to be applied/released concurrently.

16. A transmission arrangement as claimed in claim 1 in which the transmission unit includes an epicyclic gear and the ratio at which the rotary output is stationary comprises a geared neutral ratio.

* * * * *